Aug. 2, 1949.  G. M. HAIN  2,477,598
MICROWORKER FOR LUBRICATING GREASES
Filed Feb. 16, 1948
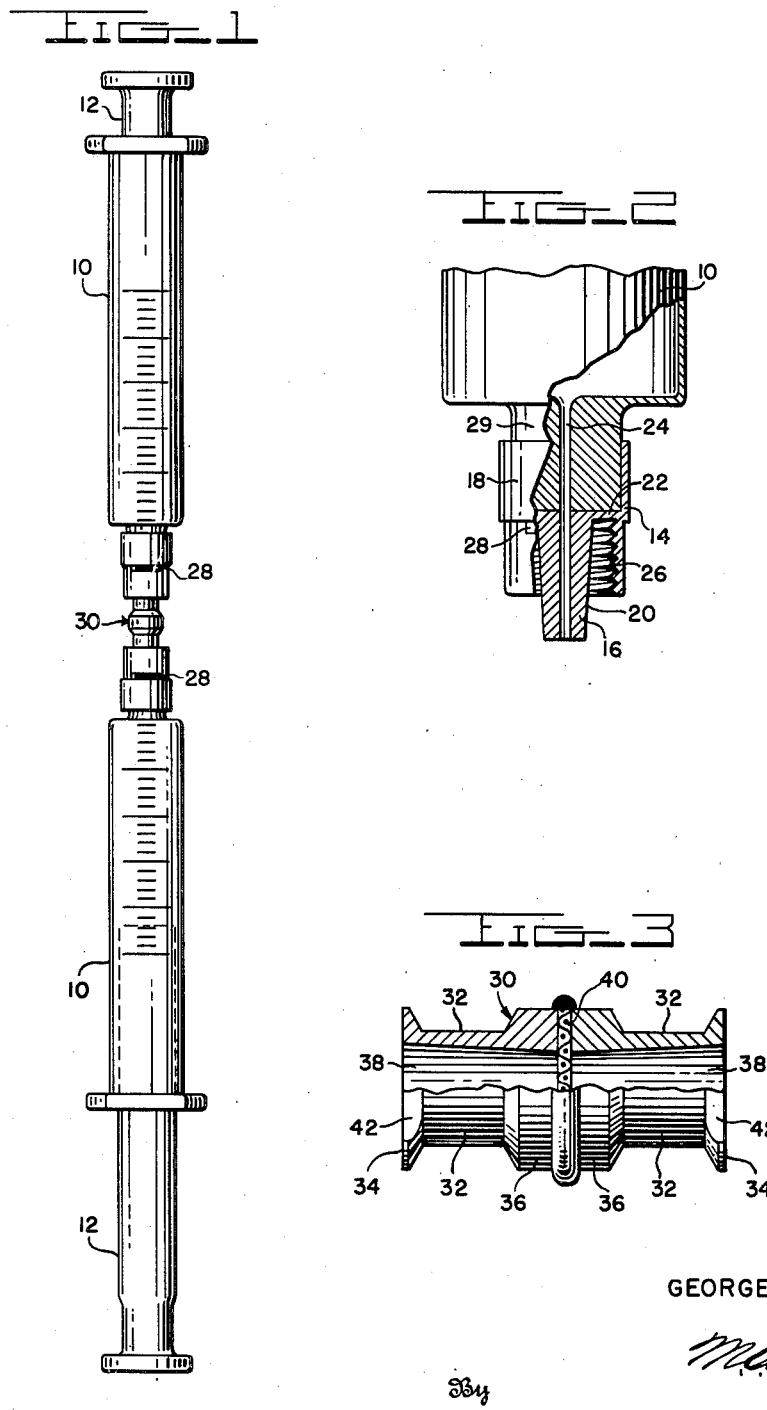
Inventor
GEORGE M. HAIN
By
Attorney Patented Aug. 2, 1949

2,477,598

UNITED STATES PATENT OFFICE 2,477,598

MICROWORKER FOR LUBRICATING GREASES

George M. Hain, Montclair, N. J.

Application February 16, 1948, Serial No. 8,706

3 Claims. (Cl. 73—60)

(Granted under the act of March 3, 1883, as amended April 30, 1928; 370 O. G. 757)

This invention relates to greaseworkers and in particular to a microworker for lubricating greases. The general object of the invention is to provide a greaseworker which will show the effect of intensive shearing action on the stability of a sample of grease in a relatively short period of time.

It is a further object of the invention to provide a greaseworker which will work a sample of grease under conditions of temperature at which the grease operates in service.

It is also an object of the invention to provide a greaseworker which will work a relatively small sample of grease, and It is an additional object of the invention to provide a greaseworker which may be used for the study of the consistency of a grease or the effect of various additives upon that quality after any number of passes of the grease through the worker.

Other objects of invention, such as economical cost and ease of manufacture, will be apparent from the following description of structure and from the drawings hereto appended which merely illustrate a preferred embodiment of the invention and are not limitative thereto. In these drawings, Figure 1 shows in elevation a preferred form of a completely assembled greaseworker.

Figure 2 is an enlarged view of the discharge end of the cylinders showing the lock tip construction. It is partly in elevation and partly in section.

Figure 3 is an enlarged view of the worker section. It also is partly in elevation and partly in section.

Referring to Figure 1, 10 represents a pair of hollow cylinders in which plungers 12 are reciprocable. These two plungers make an airtight fit with their respective cylinders. Each of these cylinders is provided with a lock tip 14 which consists of tubular tip 16 partly surrounded by hood 18. Tip 16 is exteriorly tapered as at 20 and terminates in a flange 22 which is rigidly attached to hood 18. Tip 16 is in alignment with duct 24 which communicates with the interior of cylinder 10. A passageway is thereby formed from the interior of cylinder 10 out through tip 16. Hood 18 is interiorly threaded as at 26 the function of which will be described hereinafter. Hood 18 is slotted segmentally as at 28 in diametrically opposed positions to provide openings through which any material leaking or escaping from the system may be removed. Hood 18 is securely attached to hub 29 of cylinder 10.

Referring to Figure 3, here is one form of worker section shown generally at 30. This section may function as an adapter to connect the two cylinders 10 in longitudinal alignment. This section comprises two tubular elements 32 which are provided at one end with flanges 34 and at the other end with hubs 36. Extending centrally and longitudinally through tubular elements 32 is duct 38, whose diameter is slightly larger than the external diameter of tip 16 and is tapered to fit thereon. In the construction here shown tubular elements 32 are arranged in hub to hub relationship and are rigidly fastened together as by soldering or otherwise. Screen 40 which may be of 60–400 mesh is placed between hubs 36 and extends transversely of duct 38. When tubular elements 32 are rigidly fastened together as above indicated, screen element 40 is securely held in position. Each flange 34 is cut segmentally and in diametrically opposed positions to provide a reduced diameter of the flange as at 42 whereby when the worker is inserted into hood 18, flange 34 engages thread 26 on the interior surface thereof. Upon rotation of worker 30 the flange and thread engagement moves the worker longitudinally with respect to tip 16; the surface of duct 38 impinges upon the exteriorly tapered surface of tip 16 and forms a tight seal therewith. Thus, when the two cylinders are connected by the worker section there is formed an assembly of two cylinders the plungers of which may be operated to cause a sample of grease or other fluid material to flow back and forth from cylinder to cylinder through the screen interposed in the connecting passageway. The sample being tested is subjected to an intensive shearing action not only by the screen wires but also by the differential flow of the grease through the screen.

Lubricating greases as usually made consist of a colloidal system of finely divided soap in a continuous phase of lubricating liquid. The grease, as prepared, usually contains small coherent aggregates of entangled or mechanically interlocked soap fibers or crystallites, in which the primary particles have dimensions of the order of 1.0 to 0.01 micron. The clusters, or aggregates, may have dimensions of from 10 to 100 or more microns in typical greases, having been reduced to this size by the shearing which the grease has undergone during manufacture.

The passage of the grease through a 250 mesh screen in the microworker reduces the largest dimension of all aggregates to that of the screen opening (60–70 microns) during the first few passes. Further reduction in size occurs largely as a result of strong shearing stresses set up by either laminar or turbulent flow when the grease is forced rapidly through the tiny orifices of the screen, rather than by further slicing action of the wires, which are themselves 30 or 40 microns in diameter. This shearing action on particles extending into two layers of liquid flowing at different rates of speed decreases in effectiveness with decrease in the diameter of the aggregates, but is effective on particles of an order of magnitude smaller than the openings in the screen. A particular advantage of the microworker of this invention over the generally used A. S. T. M. worker for greases (which forces the grease through holes ¼ inch in diameter) is that the small diameter of the openings in the screen results in a very high shear-gradient between the stationary film of liquid at the surface of the wire and the rapidly moving material which is passing through the center of the opening. As a result this microworker produces an amount of breakdown of grease structure in 500 passes which is comparable with that effected by 100,000 passes through the A. S. T. M. workerplate.

The operation of the device is as follows. Assume that it is desired to determine the probable change in consistency of a particular grease in service. A grease is subjected to a shearing action in service and hence the device of this invention is well suited for this determination. A sample of the grease to be tested is placed in one of the cylinders by removing the plunger from that cylinder, inserting the base of the cylinder in the grease and exerting a suction thereon through the tip of the cylinder. After the cylinder is substantially filled the plunger is inserted in the cylinder and the excess of grease over that required for the test is ejected through the tip. The loaded cylinder is then connected to the worker section and thereby to the other cylinder. The assembly is then immersed in a water bath heated to the desired working temperature. This heating of the sample requires only a very few minutes since the quantity of grease to be heated is relatively very small. This is a distinct advantage over the equipment presently used for making the same determination. Such equipment generally uses a quantity of grease weighing substantially one pound and a relatively long period of time is required for heating the test sample to the desired temperature. The grease is then passed from the loaded cylinder through the worker section into the other cylinder. This passing is accomplished by exerting a pressure on the plunger of the loaded cylinder sufficient to cause the grease to flow through the foraminous element across the passageway of the worker section. Pressure as high as 150 pounds per square inch is readily attainable in this microworker.

The study of the rate of change of consistency of a grease has been more or less standardized by measuring the micropenetration of the grease after 1, 10 and 100 passes through the microworker. Therefore, after each of this number of passes a sample of the grease is withdrawn from the cylinder in which it is then located and the penetration is determined by means of a conventional micropenetrometer. After determining the penetration of the sample, it is returned to the cylinder from which it was withdrawn and the working is proceeded with as above indicated.

Rate of change of consistency of a grease is measured by the rate of change of the amount of penetration of the grease by a penetrometer. In the case of the present invention i. e., where a microworker is employed, a micropenetrometer is used. The needle of the latter weighs approximately twenty grams and is provided with a penetrating cone of particular slope. In making the penetration determination the penetration in a period of time of five seconds is read on an indicating disc in tenth millimeters. This micropenetrometer apparatus forms no part of the present invention and hence is not illustrated.

Test runs were made on four different greases to show the change in consistency after 1, 10 and 100 passes through the microworker. The results are shown in the following table.

TABLE I

| Grease | Micropenetrations [1] After Following Number of Passes | | | |
|---|---|---|---|---|
| | Unworked | 1 | 10 | 100 |
| 250 Mesh Screen | | | | |
| No. 3 | 52 | 54 | 53 | 60 |
| No. 4 | 86 | 92 | 92 | 110 |
| No. 5 | 59 | 67 | 126 | 324 |
| No. 2 | 90 | 110 | 176 | 350 |
| 60 Mesh Screen | | | | |
| No. 2 | 90 | 103 | 140 | 243 |

[1] Micropenetration readings are in tenth millimeters.

The above data shows an increase in the micropenetration of each sample of grease and therefore a softening in the consistency of the different greases with the increasing number of passes through the microworker. The critical value of the penetration, above which a grease would be found unsatisfactory in service will naturally depend upon the use for which the grease is intended. For example a grease for a service which requires low torque value will be softer and will give higher penetration readings because of its lower consistency.

One of the chief characteritsics of the microworker is its usefulness in studying the effect of additives on the work-stability of a grease. Such additives include rust inhibitors, anti-oxidants, free acid, or other polar impurities. In the tabulation given below all greases have the same soap content and substantially the same fluid base except for additives and impurities. The fluid in all cases is di-2-ethyl-hexyl sebacate, and the soap is lithium stearate. Grease A is made from the crude diester which has been freed of polar impurities by adsorption methods. Grease B is made from the same purified diester, but contains 2 per cent of sorbitan monoleate as a rust inhibitor. Grease C is made from the crude diester, unpurified, but is otherwise identical with grease A.

TABLE II

*Effect of additives on shear stability*

| Grease | Micropenetrations after Following Number of Passes Through 400 Mesh Screen | | | |
|---|---|---|---|---|
| | Unworked | 1 | 10 | 100 |
| No. A | 74 | 81 | 89 | 100 |
| No. B | 116 | 142 | 177 | 214 |
| No. C | 125 | 135 | 164 | 230 |

In processing, these greases had already been passed eleven times through a 70 x 80 mesh wire cloth. The effect of the additives and of impurities is readily apparent when greases B and C are compared with grease A.

This grease worker has many experimental uses because of its function of intense mixing. It is, in effect, a miniature mixing kettle. It can be used to test the effect of small quantities of additives, such as water, antioxidants or rust inhibitors on experimental greases. The device is useful for making experimental cut backs to determine the effect of soap content on consistency and for making grease dispersions of the high dilution necessary in making microscopic examination of grease structure under darkfield conditions. Also, for studying the inhibiting effect of greases in thin layers on steel panels a very smooth structure is necessary, because even a slight degree of lumpiness causes streaking and variations in the film thickness. Greases which have been passed through the fine screen of the microworker a few times become remarkably smooth and uniform and ideally suited for rust inhibiting tests.

While the microworker of this invention has been described and illustrated as comprising two small cylinders arranged in longitudinal alignment, it is not desired to be strictly limited thereto as other arrangements of the cylinders, such as in parallel, could be effectively used provided that the grease or other fluid material being tested is forced to flow through an interconnecting worker section. Furthermore, the particular dimensions of the elements of the assembly are not critical. These are controlled by the quantity of sample to be worked and the pressure required for efficient working. Such modifications, as herein suggested, come within the purview and scope of the invention as defined by the herewith appended claims.

The invention described herein may be manufactured and used by or for the Government of the United States of America for governmental purposes without the payment of any royalties thereon or therefor.

I claim:

1. A device for intensive mixing and shearing of relatively small quantities of colloidal dispersions, such as lubricating greases and the like, comprising, a pair of small, hollow cylinders, a plunger for each cylinder adapted to reciprocate therein and to make an airtight fit therewith, a discharge tip on each cylinder provided with a passageway communicating with the interior of the cylinder, a worker section, provided with an axial passageway, adapted to connect the discharge tips together, to form a tight seal therewith and to form a continuous passageway from cylinder to cylinder and foraminous means positioned transversely of the passageway in said worker section for effecting an intensive shearing action upon said colloidal dispersion as it flows from cylinder to cylinder.

2. A greaseworker for working relatively small quantities of grease, comprising a pair of small hollow cylinders, a plunger for each cylinder adapted to reciprocate therein and to make an airtight fit therewith, a discharge tip on each cylinder provided with a passageway communicating with the interior of the cylinder, adapter means, provided with an axial passageway, for connecting the discharge tips of the cylinders together to form a continuous passageway from cylinder to cylinder and foraminous means positioned transversely of the passageway in said adapter means for effecting an intensive shearing action upon the grease as it flows from cylinder to cylinder.

3. A greaseworker for working relatively small quantities of fluid materials such as grease and the like, comprising, a pair of small, hollow cylinders, a plunger for each cylinder adapted to reciprocate therein and to make an airtight fit therewith, a discharge tip on each cylinder provided with a passageway communicating with the interior of the cylinder, an adapter, provided with an axial passageway, for connecting the discharge tips together in axial alignment, to form a tight seal therewith and to form a continuous passageway from cylinder to cylinder and a fine mesh screen positioned transversely of the passageway in said adapter for effecting an intensive shearing action upon said fluid materials as they flow from cylinder to cylinder.

GEORGE M. HAIN.

No references cited.